United States Patent [19]
Johansen

[11] 3,937,423
[45] Feb. 10, 1976

[54] NUTATION AND ROLL ERROR ANGLE CORRECTION MEANS
[75] Inventor: Donald G. Johansen, Manhattan Beach, Calif.
[73] Assignee: Hughes Aircraft Company, Culver City, Calif.
[22] Filed: Jan. 25, 1974
[21] Appl. No.: 436,427

[52] U.S. Cl............................ 244/3.22; 244/169
[51] Int. Cl.² ...................................... B64C 15/00
[58] Field of Search ........ 244/3.21, 3.22, 3.23, 168, 244/169

[56] References Cited
UNITED STATES PATENTS
| | | | |
|---|---|---|---|
| 3,189,299 | 6/1965 | Garner et al. | 244/3.22 X |
| 3,365,147 | 1/1968 | Wolfe | 244/3.22 UX |
| 3,511,452 | 5/1970 | Smith et al. | 244/3.23 X |
| 3,624,367 | 11/1971 | Hamilton et al. | 244/3.21 |
| 3,643,897 | 2/1972 | Johnson | 244/3.22 X |
| 3,813,067 | 5/1974 | Mork | 244/3.22 |

*Primary Examiner*—Verlin R. Pendegrass
*Attorney, Agent, or Firm*—W. H. MacAllister; Martin E. Gerry

[57] ABSTRACT

A system for controlling the attitude of a vehicle along three-axes is provided with a simple momentum wheel of one degree of freedom and several jets so as to enable correction of attitude error and dampen nutation action of the vehicle. The jets are controlled by means of a two channel control circuit terminating in logic gates that select the particular jet required to make the error correction. One of the channels is responsive to the polarity or sign of a voltage provided as input thereto whereas the other channel is responsive to threshold voltage levels provided to it, both channels being responsive to inputs from a low pass filter. The threshold voltage levels are adjusted by feedback correction paths provided in that particular portion of the control circuit.

26 Claims, 10 Drawing Figures

For Positive Damping $270° < (a_J + \mu + \gamma) < 450°$
Requires Large $\gamma$ For Positive Damping $-90° < (a_J + \mu + \gamma) < 90°$
Not Possible for Small Nutation

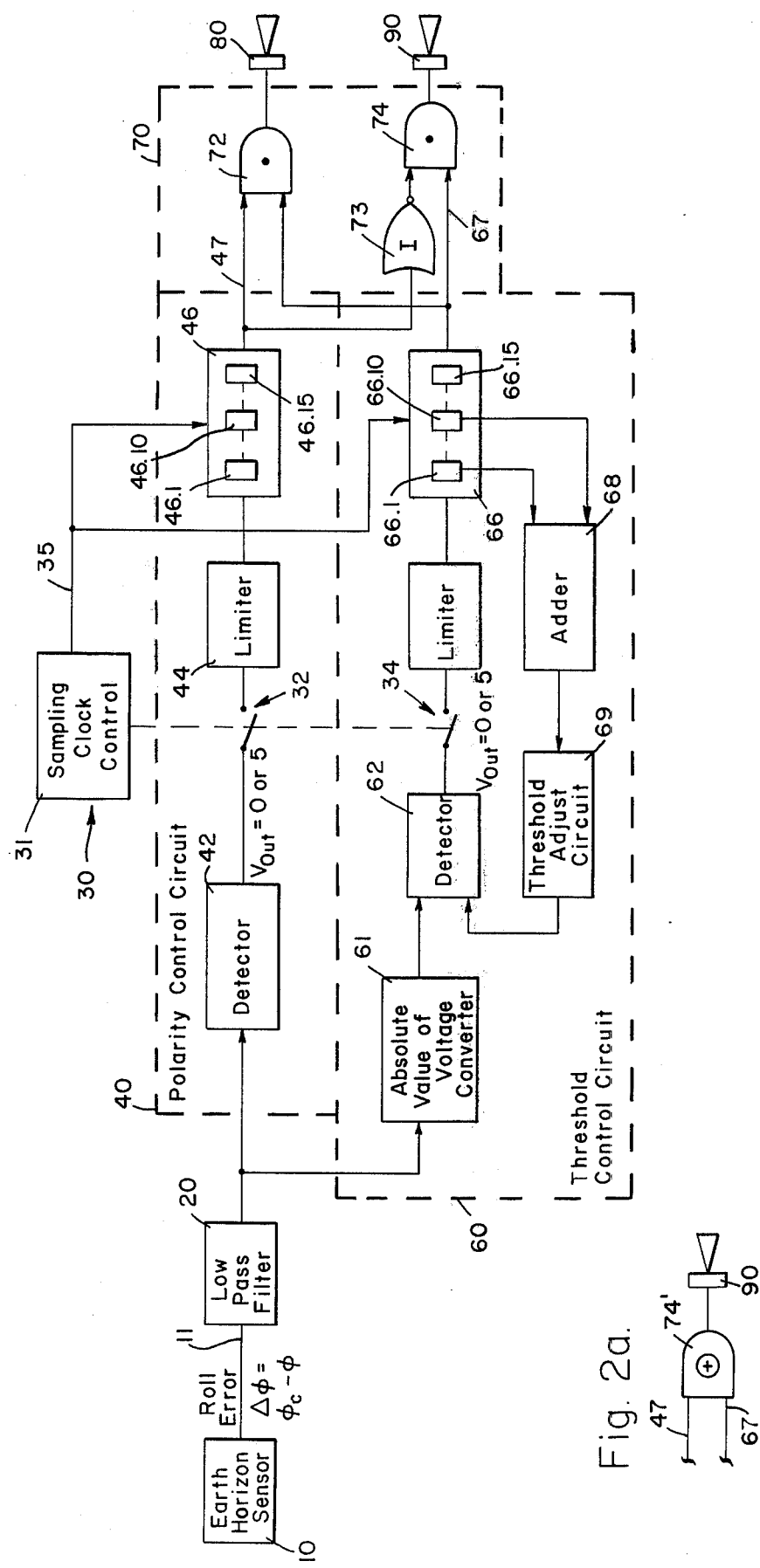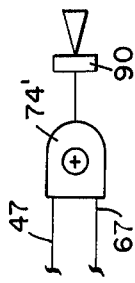

NUTATION AND ROLL ERROR ANGLE CORRECTION MEANS

BACKGROUND OF THE INVENTION

This invention is in the field of control systems for spacecraft, aircraft, satellites, missiles and other movable vehicles requiring attitude control, such control being along one, two or three axes of attitude of the control vehicle.

Generally, attitude control is gyroscopically controlled in one or more directions by means of a rotating wheel of substantial mass and rotational speed to stabilize the attitude of the vehicle in a predetermined direction. The large moments of inertia thereby produced, inhibit to a large extent, rapid correction of attitude when needed since torques or forces must be developed to counteract the effect of these moments. Gimbaling systems provide capability, in the rotating wheel stabilizer, to obtain more than one degree of freedom of stabilization. However, the more degrees of freedom sought to be obtained by these gyro stabilizers the greater the complexity thereof, and a priori, the greater the unreliability of such a control system. A reliable and relatively simple system would be required considering that certain applications of these attitude control systems may be in orbital or galaxy investigation vehicles that may require many years of operative life. Most of the control system types described by the prior art are either dependent upon gravitational action of the earth or other celestial bodies or upon their geomagnetic fields, if these exist. Thus far, at least in the solar system, only two such bodies exhibit geomagnetic fields, and hence the prior art control systems are unsuitable for a vehicle whose objectives and requirements are as extensive as the one described in the instant specification.

The types of gyro systems hereinabove described are exemplified by U.S. Pat. Nos. 3,452,948; 3,582,019; 3,188,639; 3,638,883; 3,741,500; 3,171,612; 3,105,657; 3,424,401; 3,493,194 and 3,567,155.

A control system, other than those above identified by the referenced patents, is exemplified by U.S. Pat. No. 3,291,419 which utilizes the earth's magnetic field by using magnetometer devices as sensors. The obvious disadvantage of this system, as mentioned previously, is that it is limited to control systems that depend upon a celestial body which has a magnetic field, and few of such bodies are known to possess such field. Additionally, this system is also mechanically and electrically complex and possesses a high degree of unreliability.

A system used to control aircraft by thrust producers is exemplified by U.S. Pat. No. 2,943,822. This system also employs gyroscopic mechanisms, used to control several degrees of freedom, such as a vertical gyro and a directional control gyro, in addition to propulsion units to offset gravitational effects. This patent is a hybrid between gyro and thrust control and is also very complex mechanically and electrically, and thus has a high degree of built-in unreliability and is unsuitable for the purposes intended by the instant specification.

A fluid proportional thrust system is depicted in U.S. Pat. No. 3,612,442. Attitude control is achieved in the moving vehicle of this system by the use of vortex amplifying devices to modulate continuous gas flow through the several thrustors in response to electrical or fluidic control systems. One of the obvious disadvantages of this system is that constant use of fuel is required to maintain control thus limiting severely the mission period allocated to that vehicle as well as the distances traveled from the point of launch.

Another hybrid control system utilizing a spring body and thrustors is characterized by U.S. Pat. No. 3,511,452. The system illustrated by this patent depends upon revolutions of a reaction wheel in a suitable housing energized by a plurality of pulses. Jets are also provided for controlling the vehicle rotational speed. The reaction wheel is counter-rotating with respect to the spin rotator of the vehicle and the reactor wheel speed is maintained constant. The combination of reaction wheel and spin rotator to obtain control of several degrees of freedom also results in a complex control system which does not have the capability of compensating for vehicle or spacecraft nutation motion either created internally by operation of the system or due to outside influences, in addition to being unreliable and not suitable for missions of long duration.

In conventional prior art systems, the effect of the minimum impulse bit available from thrustors is to induce a limit cycle in the spacecraft nutation. To hold the nutation-caused attitude (pointing error) within bounds of roll and yaw limits requires frequent jet firings. For example jet firing would be required about every 240 seconds to hold the pointing error within allowable deadband tolerances. While the fuel penalty for such frequent jet firings is small, the fact that such frequent firings are required from a cold start is very detrimental to thrustor reliability if, for example, monopropellant hydrazine thrustors are employed.

One system employing jet thrustors and momentum wheels in current development attempts to resolve some of the problems stated in the preceding paragraph. It attempts to accomplish this by reducing the wheel momentum to as low a value as possible so as to make the nutation period as long as possible. This minimizes the frequency of jet firings. Such system also uses a very low thrust jet device. Reduction in the minimum impulse though accomplished, is acquired at the expense of an increase in the nutation period. The thrustors employed are hydrazine dissociation types in which the fuel in cold gas form is stored, such thrustors being effectively of the cold-gas type. The specific impulse for this type of system, as well as the thrust level, is very low in the order of 80 millipounds. As a result, to effect adequate correction or reorientation of the vehicle, another propulsion system added to the system above described is needed to obtain the higher thrust levels required.

A number of theoretical papers relating to equations of motion and generally touching on three-axes control for synchronous-orbit type communication satellites have been recently written, the most important of which is entitled "Attitude Stabilization of Synchronous Satellites Employing Narrow-Beam Antennas" by Dougherty, Lebsock and Rodden, AIAA paper number 70-457, Third Communications Satellite Conference at Los Angeles, California, April 6–8, 1970. The purely theoretical treatment of equations of motion developed in this paper is thought to be necessary to tie in with the instant specification. Consequently, the equations therein were modified, to the extent required by exigencies of the instant application, in the section of this specification entitled, "Theoretical Development and Equations of Motion," hereinbelow.

Insofar as all prior art is concerned, it may be stated in summation that no known three-axes control systems have been developed capable of being operated at synchronous altitudes, the prior art systems generally being based on dual spin technology for providing attitude control. Though three-axes control systems dependent upon magnetic torquers have been used to provide control moment, these are not suitable for the system used herein for reasons already stated.

SUMMARY OF THE INVENTION

It is therefore an objective of this invention to provide a control system in a vehicle for attitude control thereof in any of three-axes orientation that utilizes only one rotatable momentum wheel in one degree of freedom and to provide the other degrees of freedom necessary to correct motion error by means of periodically pulsing jet thrustors.

It is another objective of this invention to reduce the large moments of inertia created by conventional momentum wheels, particularly wherein such momentum wheels are utilized for stabilizing the vehicle along three defined axes of orientation.

It is still another objective of this invention to provide a control system that is relatively independent in its operation upon gravitational or geomagnetic fields of other celestial bodies.

It is yet another objective of this invention to provide an attitude control system for the vehicle so that the vehicle is capable of operation at synchronous altitudes.

It is a further objective of this invention by means of accomplishing the aforementioned objectives to reduce the complexity of the vehicle attitude control system and thereby improve its reliability of operation so as to make feasible missions of long duration.

It is yet a further objective of the instant system to provide means for eliminating the limit cycle problem which besets three-axis vehicles employing momentum bias.

Briefly, the instant specification, in overcoming the objectionable limitations of the prior art, employs a combination of a variable-threshold signal level scheme to control the frequency of jet firing as a function of the size of the nutation error to be corrected, and introduces time delay into the jet firing commands to phase the jet firings properly so as to null the nutation error. What is actually done, is to damp the nutation error to the point where the error is small enough to fall not only within the deadband, but within the capture capability of the torquer device.

Accordingly, a three axes attitude control system for a vehicle is provided having a fixed momentum wheel with one degree of freedom and offset control jets. The vehicle with this control system is capable of operation at synchronous altitudes. Stable damping of nutation action of the vehicle insofar as the yaw component is achieved in the process of correcting the offset jet angle in the first quadrant of one of the coordinate axes planes by orbital coupling. Also stable damping of nutations of the vehicle with respect to the roll axis is achieved within the roll error deadband without incurring a steady-state limit cycle at the nutation frequency.

This system provides control to the vehicle utilizing a time-delay type control circuit employing shift registers having a total delay of three-fourths the nutation period and provides for threshold adjustment of one of the channels of the control circuit at the half-nutation period which results in a steady-state placement of the roll error near the null position of the spacecraft with minimal jet activity, to conserve fuel.

Briefly, mechanization involves a control system that utilizes the spacecraft roll attitude signal to generate control jet pulses which null the roll pointing error and dampen nutation action of the vehicle due to stored pitch axis momentum. Output signals from an earth horizon sensor on the vehicle is filtered by means of low pass spectral shaping to remove noise components. The filter output signals are sampled to determine if the error is larger than the deadband of one channel of the control circuit. If the error magnitude is larger than the deadband a jet pulse command is sent through a threshold pulse bit delay register in said one channel. A sign or polarity pulse bit is provided simultaneously to another channel of the control circuit having another delay register. Approximately fifteen stages or elements are used in each shift register to achieve a total jet pulse delay of three-fourths of the spacecraft nutation period. This delay results in proper phasing of the jet pulse relative to the nutation cycle of the spacecraft so that nutation damping is obtained along with precession due to roll error. To prevent excessive jet pulsing at small magnitudes of roll error the threshold pulse bits present in the first ten stages of the register in said one channel are fed back to widen the deadband. This feedback linearizes the pulse frequency versus roll error and in addition provides for an optimal two-pulse jet sequence separated by one-half of the nutation period. This controller achieves stable nutation damping over the full range of nutation amplitudes and places the error within the deadband without the use of additional nutation damping devices. Weight economy is realized by the elimination of auxiliary damping devices, not required in the instant system. Jet activity following deadband capture is reduced to near zero due to elimination of the steady-state limit cycle normally associated with jet pulsing. This results in improved lifetime reliability as well as propellant savings. Because of the inherent time delay character of the controller circuit heavy filtering of the sensor output and reduction of jet activity due to absence of sensor noise is obtained.

BRIEF DESCRIPTION OF THE DRAWINGS

FIG. 2 is an electrical block schematic showing the attitude control circuit utilized in this invention.

FIG. 2a is a schematic of an exclusive binary logic OR gate usable to replace an AND gate and an inverter gate of FIG. 2.

DETAILED DESCRIPTION

Theoretical Development and Equations of Motion

The symbols and their definitions used in connection therewith are given in Table A, and the logic of a portion of the electronic system is defined by Truth Table B. Equations of motion are also provided hereinbelow. In the theoretical discussion that follows reference will be made to symbols defined in Table A, to Truth Table B and to the equations. All equations of motion are written with respect to the orbital reference frame in FIG. 1.

TABLE A

SYMBOLIC DEFINITIONS

| | |
|---|---|
| B | Transformation matrix from inertia to body coordinates |
| G | Gravity gradient torque (lb.-ft.) |
| $H_X$ | Nominal wheel momentum (lb.-ft.-sec.) |
| $H_x, H_y, H_z$ | Roll, pitch, and yaw components of control angular momentum respectively (lb.-ft.-sec.) |
| $I_x$ | Roll moment of inertia (slug-ft²) |
| $I_y$ | Pitch moment of inertia (slug-ft²) |
| $I_z$ | Yaw moment of inertia (slug-ft²) |
| $I_{bit}$ | Jet impulse bit |
| $M_{xc}, M_{zc}$ | Control moments about roll and yaw axes respectively (lb.-ft.) |
| M | Is magnitude of the control moment comprising $M_{xc}$ and $M_{zc}$ |
| P | The nutation period of the vehicle |

TABLE A-continued

SYMBOLIC DEFINITIONS

| | |
|---|---|
| $T_x, T_z$ | External roll and yaw disturbance torques respectively (lb.-ft.) |
| t | Time (sec) |
| $\alpha_J$ | Jet torque offset angle |
| $\phi$ | Roll Euler angle (radians) |
| $\theta$ | Pitch Euler angle (radians) |
| $\psi$ | Yaw Euler angle (radians) |
| $\omega_o$ | Orbit rate (rad/sec) |
| $\omega_1, \omega_2$ | Natural frequencies (rad/sec) |
| $\omega_x, \omega_y, \omega_z$ | Roll, pitch, and yaw body rates respectively (rad/sec) |
| $\omega_n$ | Nutation frequency |
| $\tau$ | Low pass filter shaping time constant |
| N | Number of stages in delay registers 46 and 66 |
| $N_1$ | Nutation amplitude prior to jet pulsing |
| $N_2$ | Nutation amplitude after jet pulsing |
| $\Delta N$ | Precession of vehicle due to jet pulse |
| $\beta$ | Deadband half width |
| $T_{LC}$ | Limit cycle period |
| T | Sample period provided by circuit 30 of FIG. 2 |
| $\underline{X}$ | Roll vector in direction of flight of vehicle, perpendicular to Euler angle $\phi$ |
| $\underline{X}'$ | Jet torquing vector |
| $\underline{Y}$ | Pitch vector, perpendicular to Euler angle $\Theta$ |
| $\underline{Z}$ | Yaw vector, perpendicular to Euler angle $\psi$ |
| $(\cdot)$ | Time derivative with respect to inertial coordinates |
| $(\cdot\cdot)$ | Second time derivative with respect to inertial coordinates |
| $(°)$ | Time derivative with respect to body coordinates |
| $(\underline{\,})$ | All underscored symbols are vectors |

TABLE B

Figure 3:
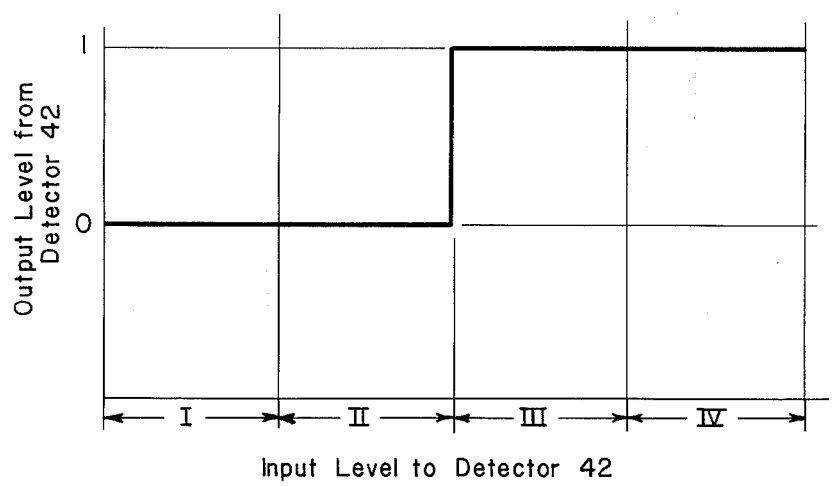
FIG. 3 is a response curve of logic levels in one of the channels of the attitude control circuit.
Figure 4:
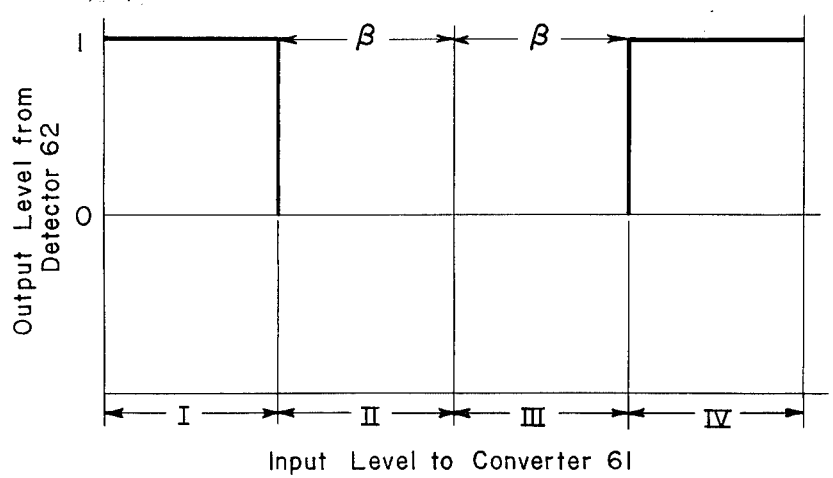
FIG. 4 is a response curve of the logic levels in the other of the channels of the attitude control circuit.

TRUTH TABLE
ZONES AS REFERRED TO FIGS. 3 and 4

| | I | II | III | IV |
|---|---|---|---|---|
| Detector 42 | 0 | 0 | 1 | 1 |
| Detector 62 | 1 | 0 | 0 | 1 |

EQUATIONS OF MOTION $$H = H_B + H_W = \begin{bmatrix} I_x \omega_x \\ I_y \omega_y \\ I_z \omega_z \end{bmatrix} + \begin{bmatrix} H_x \\ H_y - H_X \\ H_z \end{bmatrix} \tag{1}$$

$$T + G = \overset{\circ}{H} = \overset{\circ}{H}_B + \overset{\circ}{H}_W + \omega_B \times (H_B + H_W) \tag{2}$$

$$T + G = \begin{bmatrix} I_x \overset{\circ}{\omega}_x + (I_z - I_y)\omega_y\omega_z + \omega_y H_z - \omega_z(H_y - H_X) \\ I_y \overset{\circ}{\omega}_y + (I_x - I_z)\omega_x\omega_z + \overset{\circ}{H}_y + \omega_z H_x - \omega_x H_z \\ I_z \overset{\circ}{\omega}_z + (I_y - I_x)\omega_x\omega_y + \omega_x(H_y - H_X) - \omega_y H_x \end{bmatrix} \tag{3}$$

$$G = -3\omega_o^2 \begin{bmatrix} \sin\phi & \cos\phi & \cos^2\theta(I_y - I_z) \\ \sin\theta & \cos\theta & \cos\phi(I_x - I_z) \\ \sin\phi & \sin\theta & \cos\theta(I_y - I_x) \end{bmatrix} \tag{4}$$

$$\begin{bmatrix} \dot\phi \\ \dot\theta \\ \dot\psi \end{bmatrix} = \frac{1}{\cos\theta}\begin{bmatrix} \cos\theta & \sin\phi\sin\theta & \cos\phi\sin\theta \\ 0 & \cos\phi\cos\theta & -\sin\phi\cos\theta \\ 0 & \sin\phi & \cos\phi \end{bmatrix}\begin{bmatrix} \omega_x \\ \omega_y \\ \omega_z \end{bmatrix} + \omega_o \begin{bmatrix} \sin\psi \\ \cos\psi\cos\theta \\ \sin\psi\cos\theta \end{bmatrix} \tag{5}$$

$$\left.\begin{array}{l} M_{xc} + T_x = I_x\ddot\phi + (a + \omega_o H_X)\phi + (b + H_X)\dot\psi - \omega_o H_z \\ M_{yc} + T_y = I_y\ddot\theta + d\theta + \overset{\circ}{H}_y \\ M_{zc} + T_z = I_z\ddot\psi + (c + \omega_o H_X)\psi - (b + H_X)\dot\phi + \omega_o H_x \end{array}\right.$$

where
$a = 4\omega_o^2(I_y - I_z)$
$b = -(I_x - I_y + I_z)\omega_o$
$c = \omega_o^2(I_y - I_x)$
$d = 3\omega_o^2(I_x - I_z)$ $\tag{6}$ $$H_X \gg \max[I_x\omega_o, I_y\omega_o, I_z\omega_o] \tag{7}$$

$$\left.\begin{array}{l} M_{xc} + T_x = I_x\ddot\phi + \omega_o H_X\phi + H_X\dot\psi \\ M_{zc} + T_z = I_z\ddot\psi + \omega_o H_X\psi - H_X\dot\phi \end{array}\right\} \tag{8}$$

$$\psi_{SS} = \frac{T_z}{\omega_o H_X} \tag{9}$$

Figure 1:
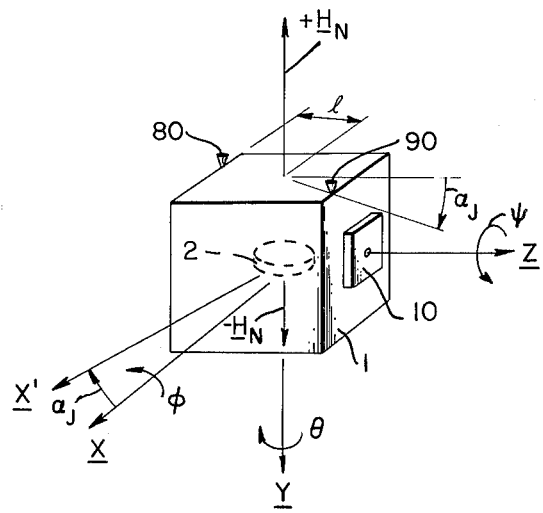
FIG. 1 is a perspective schematic view of a spacecraft for the purpose of showing the attitude control components and the vectors describing the spacecraft orientation.
Figure 1B:
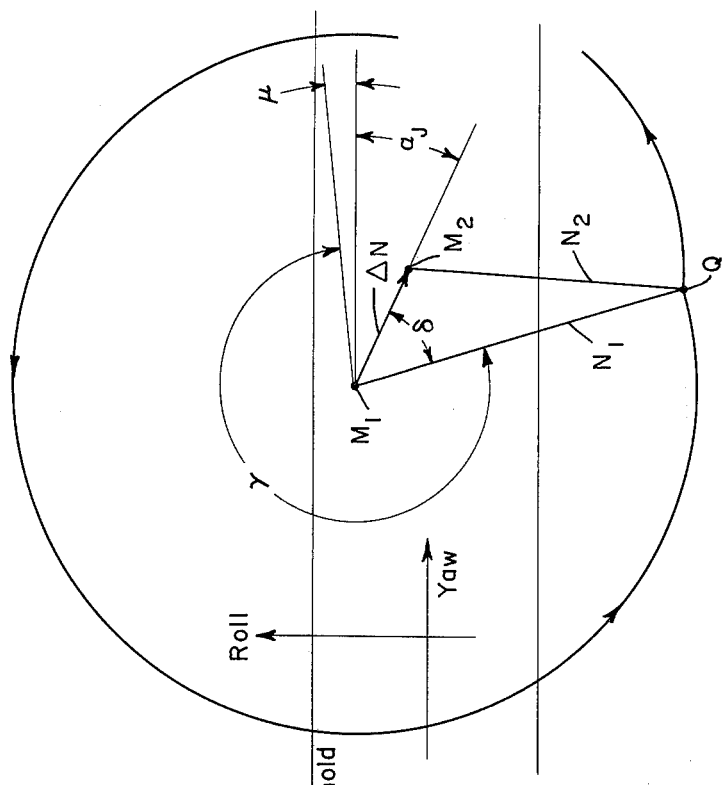
FIG. 1b is a pattern diagrammatic view of effects for positive nutation damping where large nutation amplitudes may be involved and for avoiding steady state limit cycle behavior.
Figure 1A:
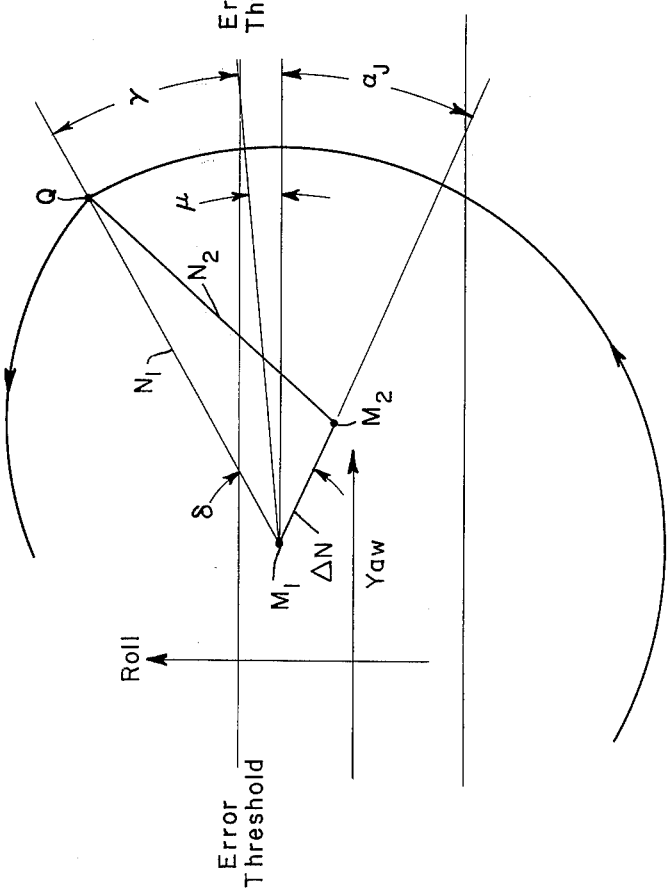
FIG. 1a is a pattern diagrammatic view of effects for positive large nutation damping amplitudes of the spacecraft.

TABLE B-continued
TRUTH TABLE
ZONES AS REFERRED TO FIGS. 3 and 4
I   II   III   IV $$H_X = \frac{T_z \max}{\omega_o \psi \max} \tag{10}$$

$$\omega_1 \cong \frac{H_X}{\sqrt{I_x I_z}}; \text{ and } \omega_2 \cong \omega_o \tag{11}$$

$$\left. \begin{array}{l} M_{xc} + T_x = \omega_o H_X \phi + H_X \dot{\psi} \\ M_{zc} + T_z = \omega_o H_X \psi - H_X \dot{\phi} \\ \text{where} \quad M_{xc} = M \cos \alpha_J \text{ and} \\ \quad\quad\quad M_{zc} = -M \sin \alpha_J \end{array} \right\} \tag{12}$$

$$\sin \alpha_J \dot{\psi} + \omega_o \cos \alpha_J \psi = (T_x \sin \alpha_J + T_z \cos \alpha_J)/H_X \tag{13}$$

$$\left. \begin{array}{l} M_{xc} = I_x \ddot{\phi} + H_X \dot{\psi} \\ M_{zc} = I_z \ddot{\psi} - H_X \dot{\phi} \end{array} \right\} \tag{14}$$

$$\Delta \phi = \phi_c - \phi \tag{15}$$

$$\left. \begin{array}{l} T_{LC} = \dfrac{8\beta}{\dot{\beta}} \\[4pt] \text{where} \quad T_{LC} \text{ is the limit cycle period} \\ \quad\quad\quad \beta \text{ is the deadband halfwidth} \\ \quad\quad\quad \dot{\beta} \text{ is the rate imparted by a jet} \\ \quad\quad\quad\quad \text{minimum impulse bit} \end{array} \right\} \tag{16}$$

$$\left. \begin{array}{l} |I_{bit}| < \lambda \phi_{on} H \\ I_{bit} \text{ is the jet impulse bit} \\ 1 \text{ is the length of moment arm of the vehicle} \\ \lambda \text{ is a function of } \tau, t_d \text{ and } \alpha_J, \text{ where} \\ \quad \tau \text{ is filter 20 time constant, and} \\ \quad t_d \text{ is the jet pulse time delay} \\ H \text{ is the pitch axis momentum bias} \\ \phi_{on} \text{ is the minimum half deadband threshold} \\ \quad \text{level, is also approximately equal to} \\ \quad N \text{ } Nper \text{ equation (21)} \end{array} \right\} \tag{17}$$

$$\left. \begin{array}{l} \phi = \phi_{on} \left(1 + \dfrac{kfP}{2}\right) \\[4pt] f \text{ is the jet firing frequency} \\ k \text{ is the gain parameter that influences} \\ \quad \text{the time response for initial roll} \\ \quad \text{errors below saturation value} \\ P \text{ is the nutation period} \end{array} \right\} \tag{18}$$

$$\left. \begin{array}{l} \phi_{sat} = \phi_{on}\left(1 + \dfrac{kP}{2T}\right) \\[4pt] \text{where} \quad \phi_{sat} \text{ is error corresponding to} \\ \quad\quad \text{maximum jet frequency } f = \dfrac{1}{T}, \text{ where} \\ \quad\quad T \text{ is the sample period provided by} \\ \quad\quad \text{clock control circuit 30 as in FIGURE 2.} \end{array} \right\} \tag{19}$$

$$\left. \begin{array}{l} \omega_n \tau = 1 \\ \text{where} \quad \omega_n = \text{nutation frequency and is also} \\ \quad\quad \dfrac{2\pi}{P} \\ \quad\quad \tau = \text{low pass filter shaping time} \\ \quad\quad\quad \text{constant} \end{array} \right\} \tag{20}$$

$$\left. \begin{array}{l} \left(\dfrac{N_2}{N_1}\right)^2 = 1 + \left(\dfrac{\Delta N}{N_1}\right)^2 - 2\left(\dfrac{\Delta N}{N_1}\right)\cos \delta \\[6pt] \text{where} \quad N_1 \text{ is the nutation amplitude prior} \\ \quad\quad\quad\quad\quad \text{to jet pulsing} \\ \quad\quad\quad N_2 \text{ is the nutation amplitude after} \\ \quad\quad\quad\quad\quad \text{jet pulsing} \\ \quad\quad\quad \Delta N \text{ is the precession due to the jet} \\ \quad\quad\quad\quad\quad \text{pulse} \\ \quad\quad\quad \delta \text{ is the interior angle between} \\ \quad\quad\quad\quad \Delta N \text{ and } N_1. \\ \quad\quad\quad\quad \text{where } \delta \quad \text{in FIG. 1a representing} \\ \quad\quad\quad\quad\quad\quad\quad\quad \text{small signal delay, is} \\ \quad\quad\quad\quad\quad\quad\quad\quad \alpha_J + \mu + \gamma \\ \quad\quad\quad\quad\quad\quad \mu \quad \text{being the dead zone} \\ \quad\quad\quad\quad\quad\quad\quad\quad \text{variable delay and is} \\ \quad\quad\quad\quad\quad\quad\quad\quad 0 < \mu < 90° \\ \quad\quad\quad\quad\quad\quad \gamma \quad \text{being the controller} \\ \quad\quad\quad\quad\quad\quad\quad\quad \text{fixed delay and is} \\ \quad\quad\quad\quad\quad\quad\quad\quad > 0 \\ \quad\quad\quad\quad\quad\quad \alpha_J, \text{ as before defined,} \\ \quad\quad\quad\quad\quad\quad\quad\quad \text{is } 0 < \alpha_J < 90°; \text{ and} \\ \quad\quad\quad\quad\quad\quad \delta \quad \text{in FIG. 1b representing} \\ \quad\quad\quad\quad\quad\quad\quad\quad \text{large signal delay is} \\ \quad\quad\quad\quad\quad\quad\quad\quad 360 - (\alpha_J + \mu + \gamma) \end{array} \right\} \tag{21}$$

TABLE B-continued
TRUTH TABLE
ZONES AS REFERRED TO FIGS. 3 and 4
I  II  III  IV $\gamma_s$ = sensor 10 lag
$\gamma_F$ = $\tan^{-1} \omega_n \tau$
which is filter 20 lag.
$\gamma_T$ = $\dfrac{\omega_n T}{2}$
which is lag contributed by switching of sampling switch 30.
$\gamma_D = \omega_n T N$
where N is the number of stages in shift registers 46 and 66, herein 15 stages.

(22)

Referring to FIG. 1, coordinate axes definition of spacecraft 1 is shown as it relates to an internal axis momentum wheel 2 as it rotates in a plane perpendicular to pitch vector $Y$ of the spacecraft, which is also perpendicular to the plane of pitch Euler angle $\theta$. Angle $\phi$ defines the roll Euler angle rotation of the spacecraft about the $X$ vector which $X$ vector defines the direction of flight of the spacecraft. Angle $\psi$ defines the yaw Euler angle of the spacecraft about the $Z$ vector, which $Z$ vector is pointed towards the earth in this illustration. Vectors $X$, $Y$ and $Z$ are orthogonal with respect to each other. Earth horizon sensor 10 is mounted on the spacecraft in a place perpendicular to vector $Z$.

The total angular moments may be written as the sum of body and wheel contributions including the wheel bias, which may be mathematically stated by equation (1).

Identifying the gravity gradient torques separately, Euler's equations are stated by equations (2) or (3).

For circular orbits (of interest at synchronous altitude), the gravity gradient torque is, in terms the Euler rotations $\phi$, $\theta$, and $\psi$, stated by equation (4).

The Euler and body rates of $\phi$, $\theta$, and $\psi$ are related by equation (5).

Solving Eq. (5) to eliminate body rates from equation (3), and adding the results of equation (4) thereto yields the desired non-linear equations of motion of the spacecraft.

For small angles, the non-linear equations developed herein, may be reduced to a set of linear, constant-coefficient differential equations, in terms of the roll, pitch, and yaw angles, and the three components of incremental angular momentum of the wheel, $\phi$, $\theta$, $\psi$, $H_x$, $H_y$, $H_z$ respectively. For such small angles, linearized form of these equations may be represented by equation set (6).

In the following treatment, it is assumed that the wheel spin axis coincides with the pitch axis, so that $H_x = H_z = 0$.

The linearized pitch dynamics are uncoupled from roll and yaw and are independent of the bias momentum $H_N$. Only the coupled roll and yaw equations are considered in the following analysis.

The bias angular momentum is chosen to greatly increase the coupling of the roll and yaw dynamics. Since yaw errors are not observable, it is desirable to increase the yaw coupling into the roll dynamics to permit indirect control of yaw. This is accomplished by using a large value of bias angular momentum so that the gyroscopic coupling ($H_N \dot\psi$) of yaw rate into the roll dynamics is significant. This results in the condition expressed by equation (7).

Consequently the coupled roll/yaw equations can be written approximately as expressed by equations (8).

The approximate value of the bias angular momentum and the general form of the roll and yaw momentum controller can be determined by considering the uncontrolled roll/yaw equations, where $M_{xc} = M_{zc} = 0$. First note that in the steady state the yaw offset due to a constant yaw torque is given by equation (9).

This represents the unobservable constant of integration of the yaw equation of motion. This offset is uncontrollable but can be limited to an acceptable value by adjusting the bias momentum. When the $M_{rc}$ and $M_{zc}$ terms are used to control the roll/yaw dynamics, the additional coupling will result in an additional steady-state yaw offset due to a constant roll torque. It will be shown later that the additional yaw offset due to a roll torque is small and, consequently, equation (10) can be used to size the bias momentum.

The uncontrolled roll/yaw dynamics can be shown to have natural frequencies approximated in equation (11). The high frequency term $\omega_1$ represents the nutation motion of a gyroscope, whereas the low frequence term $\omega_2$ is orbit rate motion and is due to the rotation of the orbit frame with respect to inertial space. The uncontrolled torque-free motion is a nutation or high frequency coning of the spin axis about a fixed direction in inertial space. The fixed inertial direction appears to rotate at orbit rate with respect to the orbit reference frame.

An approximate constraint on design range for $\alpha_J$ may be shown by considering only low frequency motion wherein roll attitude is maintained near zero through pulsing of the offset jets such that roll error is driven to zero.

For long period motion the second derivative terms $\ddot\psi$ and $\ddot\phi$ may be taken as zero. Long periods of motion may be expressed by equations (12).

Although the attitude correction takes place as a series of jet pulses, it is appropriate to consider with long term motion, that the control is continuous and that this control results in continuous nulling of roll attitude so that we may take $\phi = \dot\phi = 0$. There thus results from equation (12), equation (13) describing yaw motion.

Equation (13) defines stability where $\alpha_J$ is only in the first or third quadrants. Under the equivalence of equation (13), with correction for polarity, we shall consider only the condition when $0 < \alpha_J < 90°$.

Considering the short period version represented by equations (8), short term period equations are obtained by taking $\omega_o = 0$ and $T_x = T_z = 0$, the result of which is shown by equations (14).

Equations (14) will be taken as representing the dynamic model to be controlled, which is discussed in terms of structure, function and mechanization hereinbelow, in this specification.

Referring to FIGS. 1, 1a and 1b and considering the requirements to be met by the instant system it must be recognized that it is well know that single axis attitude control systems without stored momentum using only reaction jets can operate only in a limit cycle mode. This is due to the difficulty achieving reliable jet pulsing below the minimum impulse bit level. A steady state condition for such control system, with substantially zero disturbance torque, provides double-sided jet pulsing within the deadband. A typical limit cycle period thereof is defined by equation (16). The relationship between the parameters of equation (16), taking into consideration variation in deadband, indicates a trade between pointing accuracy and lifetime jet activity which becomes more favorable to each as the minimum impulse bit is reduced. Minimum impulse bit in turn is often dictated by thrust and moment arm sizing for fast time response and jet minimum on time limitations.

This situation is greatly changed in the present invention by the presence of stored momentum within the spacecraft by means of momentum wheel 2. For example, in a pitch momentum bias system with a component of jet impulse torque applied about yaw axis $\underline{Z}$, the roll error is nulled by a series of jet pulses which precess the total spacecraft momentum such that the spin vector is in the local horizontal plane. As jet pulsing results in spacecraft nutation about the inertial momentum vector, it is necessary that a jet torque be applied about roll axis $\underline{X}$, and that proper phasing of the jet pulses relative to the nutation cycle be employed to assure jet nutation damping.

This invention presents a momentum bias jet controller which achieves roll attitude nulling. The control system is one that is related to a steady state behavior which does not exhibit limit cycle behavior. Such control system results in a large reduction of jet activity over the mission lifetime with attendant jet reliability improvement.

The overall system provides torque pulses to null the roll sensor output using the offset jets. The residual yaw error is subsequently nulled through orbital coupling. Stable yaw nulling requires offset angle $\alpha_J$ to be in the first quadrant, namely between zero and ninety degrees.

The sensor used herein provides an output which is first filtered to remove high frequency noise components and prevent jet activity when the actual roll error is within deadband $2\beta$. Since the overall phase lag through the controller is high, it is possible to use high filter time constants and significantly reduce the RMS noise. Filter time constants in the order of ten percent of the nutation period are realizable. Thus, for example, for a nutation period of 250 seconds, a filter time constant of 25 seconds would result. Sensor noise figures are typically based on a time constant of one second, so that a factor of five in RMS noise reduction can be achieved.

The filtered error signal is next passed through the deadband element which determines if positive or negative jet pulsing is required. The error is sampled at a period which is at least an order of magnitude below the nutation period. This is necessary to minimize the uncertainty of the time of deadband crossing which contributes a random phase error to jet pulsing. For example, with a sample period of one-twentieth of the nutation period, a maximum pulse phase lag error of 18° is possible. However, this may be offset by loop phase adjustment of 9° lead so that the uncertainty is distributed evenly about the design point.

The deadband threshold is adjusted based on sampling history within the prior half nutation period. Thus, the deadband is widened by either positive or negative jet pulse samples. Negative jet pulse samples are electronically reversed in the control system so they appear as positive samples to the sampling means therein. For small errors, this produces jet pulses which are separated by half the nutation period. Such a separation results in minimum residual nutation. For large errors, the deadband adjustment results in increased jet pulsing frequency and thereby gives faster time response. The maximum pulsing frequency is equal to the sample frequency or twenty pulses per nutation cycle.

The sample consists of two binary bits of information. The threshold bit indicates if the deadband threshold, whether positive or negative, has been exceed. The sign bit indicates the sign of the error signal. These bits are input for the two-shift registers which act to delay jet pulsing so that proper phasing is obtained between the nutation cycle and the jet control pulse. The first ten bits of the threshold register adjust the deadband to achieve the derived rate of behavior as discussed in the preceeding paragraph.

The signal and threshold bits are combined at the output of the shift register to pulse the appropriate positive or negative control jet for a fixed pulse width if the threshold bit is equal to binary logic ONE. The jet torquing axis is defined by vector X and in general produces a roll as well as a yaw torque. The offset angle, $\alpha_J$, denotes the angle between the roll axis and the jet torquing axis. Although most efficient roll control is obtained at $\alpha_J = 90°$ (pure yaw torque) the requirements of yaw control through orbital coupling dictate a reduced offset angle, typically less than 30°.

The deadband threshold is selected as a compromise between minimizing pointing error and maximizing jet impulse bit. The steady state limit cycle may be avoided by satisfying a criteria of the form stated by relationship (17) under title of "Equations of Motion," hereinabove. Transient data obtained, indicates that $\lambda \cong 1$.

For roll errors outside the deadband, the jet firing frequency, $f$, varies according to relationship (18) up to the maximum value of $f$. Thus the gain parameter $k$ influences the time response for initial roll errors below the saturation value $\phi_{sat}$ defined by equation (19). A value of unity may be selected for $k$. It does not appear desirable to decrease $k$ greatly below unity (to 0.1 for example) as this could result in unwanted multiple firings due to sensor noise when the roll error is near the deadband.

For convenience of analysis, the design constraint as stated by equation (20) is imposed on the low pass filter time constant $\tau$. This permits approximation of the filter as a pure phase delay at nutation frequency, $\omega_n$. Analog computer simulation as necessary to determine a realistic upper bound for $\tau$.

Nutation damping considerations are used to determine the total time delay between error sampling and jet pulsing. The need for proper jet pulse phasing with the nutation cycle is illustrated in FIGS. 1a and 1b showing projection of the total spacecraft momentum vector and the pitch axis on the celestial sphere. These are denoted by points $M_1$, $M_2$ and Q. Prior to jet firing, the spacecraft is nutating about the inertially fixed momentum vector $M_1$. Jet firing precesses the momentum vector to $M_2$ and results in a new nutation amplitude. Jet damping results if the nutation amplitude is decreased by the jet pulse. The nutation before and after are related by the law of cosines for the triangle M, $QM_2$ as stated by equation (21). In equation (21) it is show that $\Delta N$ is the precession due to the jet pulse and $\delta$ is the acute angle $\angle QM_1M_2$. This relation defines a region of acceptable firing angles to achieve $N_2 < N_1$. At large amplitudes ($N_1 >> \Delta_N$) such range is bounded by $\delta < 90°$. As the nutation amplitude decreases, the range of acceptable $\delta$ decreases. Thus, at $N_1 = \Delta N/2$, the acceptable range of firing angle collapses to zero so that jet damping below this amplitude is not possible. At $N_1 = \Delta N$ a more realistic range of $|\delta| < 60°$ achieves positive damping. It may be anticipated that $\phi_{on} \cong \Delta N$ is a reasonable first approximation for relating torque bit to roll deadband. The interior angle, $\delta$, relates the relative phase of jet pulsing to the nutation phase. Zero nutation phase is defined at maximum yaw attitude. As can be seen from FIG. 1a, $\delta$ has three components: $\alpha_J$ is the jet offset angle, $\mu$ is the phase lag due to finite deadband, and $\gamma$ are fixed, $\mu$ will vary with nutation amplitude. At small nutation amplitudes, $\mu$ approaches 90° and with positive $\alpha_J$ and $\gamma$, an undesireable steady state limit cycle results. Positive $\alpha_J$ is required for static stability and positive $\gamma$ is present due to the need for lag shaping to filter the roll sensor output.

FIG. 1b however illustrates the merits of the jet controller used in connection with FIG. 1. Using a large signal delay permits both the use of lag filtering and the nominal phasing of jet pulses for maximum damping. Thus a steady state limit cycle is avoided with a system having high noise rejection. Given $\alpha_J$ the design may be specified by selecting $\gamma$ which represents the sum of electronic phase lags from the sensor input to the control jets; the phase lags being stated by expressions (22), as related to the control circuit shown in FIG. 2.

Design of $\gamma$ is selected as a compromise to obtain good damping at large and small nutation amplitudes. Referring to FIG. 1b, it is seen that $\mu$ varies from zero at large nutation amplitudes to 90° at small amplitudes which are comparable to the deadband. Maximum damping, corresponds to $\delta = 360°$ for these limiting cases, which is obtained for $\gamma$ as follows. For the case of large amplitudes, the optimum $\gamma = 360 - \alpha_J$, and for the case of small amplitudes the optimum $\gamma = 270 - \alpha_J$. For preliminary design $\gamma$ will be taken as the average of these limiting values. Thus $\gamma = 315° - \alpha_J$. This value results in 45° phase lead from the optimum at large nutation and hence results in decreased damping by a facot of $1/\sqrt{2}$. A similar loss of damping occurs at low amplitudes due to phase lag from the optimum. Phase stability margins are narrower at low amplitude due to the decreased damping range of $\delta$. Thus a more optimized design would possibly weight the small amplitude case more heavily.

Figure 1C:
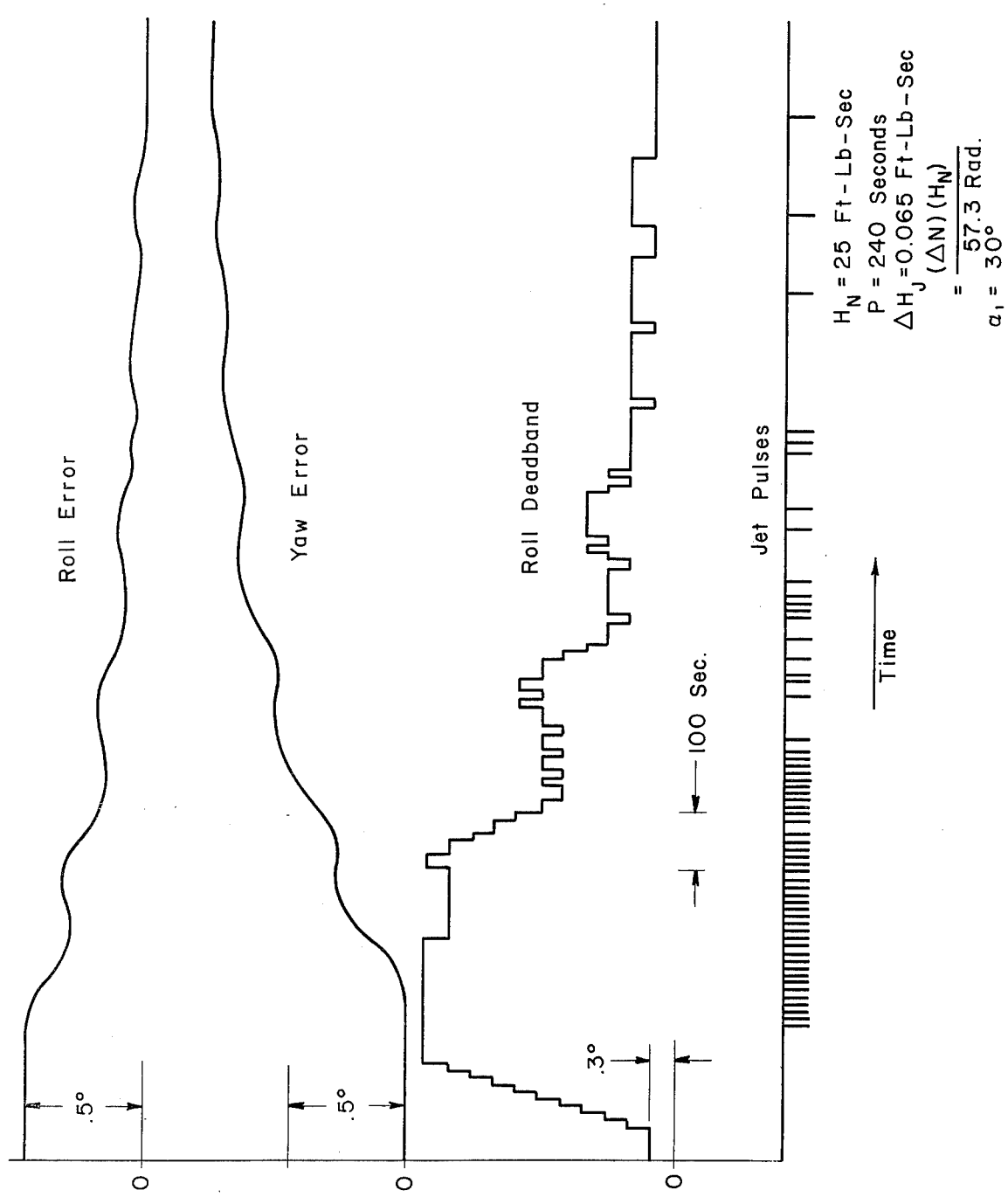
FIG. 1c shows roll aquisition results obtained for the instant system utilizing analog computer simulation.
Figure 1D:
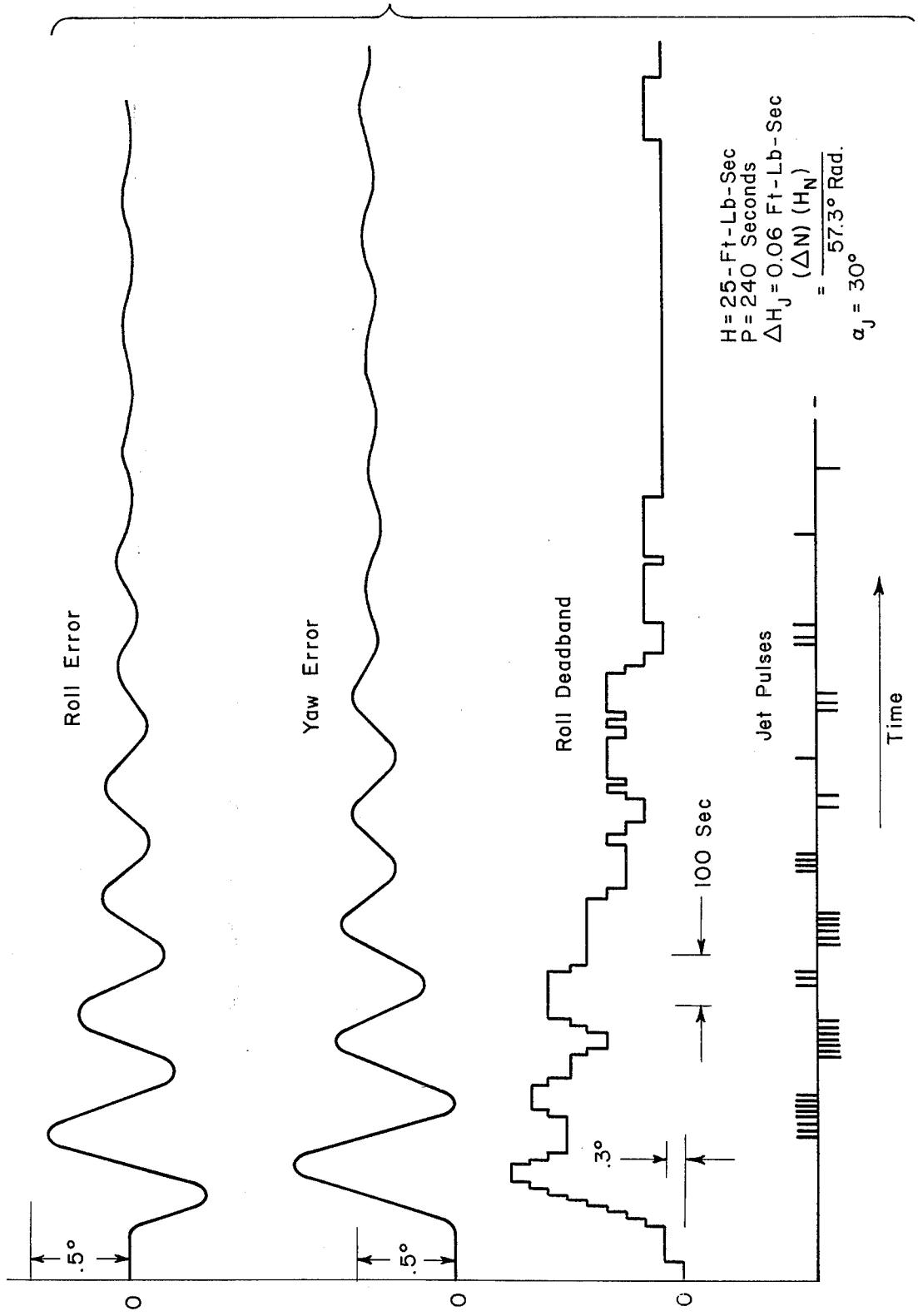
FIG. 1d shows nutation damping results obtained for the instant system utilizing analog computer simulation.

Referring to FIG. 1c showing roll acquisition and FIG. 1d showing nutation damping, the spacecraft transient response and control performance exhibit the following parameters as obtained by analog computer simulation:

| | | |
|---|---|---|
| Jet Offset Angle | $\alpha_J$ | = 30 degrees |
| Roll Deadband | $\phi_{on}$ | = 0.03 degrees |
| Jet Pulse Precession Angle | $\Delta N$ | = 0.015 degrees |
| Nutation Period | P | = 240 seconds |
| Sampling Time by Means 30 | T | = 12 seconds |
| Delay Stages in Registers 46 and 66 | N | = 15 |
| Feedback Gain Constant | k | = 1.0 |
| Sensor Time Constant | $T_S$ | = 1 second, which is $\frac{\gamma_s}{\omega_n}$ |
| Filter 20 Time Constant | $\tau_F$ | = 8 seconds, which is $\frac{\gamma_f}{\omega_n}$ |

FIG. 1c shows the roll nulling response to an initial roll error of 0.5°. The error is placed within the deadband with negligible steady state nutation. In FIG. 1d, an initial nutation is damped by the jet controller to a steady state nutation within the deadband. In the case shown, a steady disturbance torque causes periodic jet corrections as the roll error drifts outside the deadband. In both cases, a residual yaw error occurs. This is nulled through orbital coupling due to the offset of the jets.

MECHANIZATION OF THEORETICAL DEVELOPMENT AND EQUATIONS OF MOTION

Referring to FIGS. 1, 2, 2a, 3 and 4, infrared sensor 10 is mounted on spacecraft 1 which is oriented to have a field of view of the earth directed along yaw $\underline{Z}$, for scanning across the horizon of the earth, and for comparing the secant of the chord of the angle made by axis $\underline{Z}$ with respect to a reference chord on the earth, the reference chord angle ranging between 35° and 55°, and being typically 45°. Earth horizon sensor 10 is oriented orthogonal to the $\underline{Z}$ axis, measures the error in roll angle $\phi$ as defined by equation (15), where $\Delta\phi$ is the angular change of roll attitude with respect to the reference chord, and is a negative change if the error is above the reference chord, or a positive change, if the error is below the reference card, $\phi_c$ is the commanded roll angle supplied by the spacecraft, and $\phi$ is the actual roll angle with respect to such reference chord. Such sensors are known in the art and need not be discussed in detail.

It should be noted that one momentum wheel 2 is utilized in spacecraft 1 rotating at angle $\theta$, perpendicular to the pitch axis vector $\underline{Y}$, together with jet thrustors 80 and 90 to be hereinafter discussed. It is possible to utilize several momentum wheels to perform the same function performed by said one momentum wheel, in which case their wheels will have one degree of freedom each and rotate in the same plane.

Low pass filter 20 is connected by means of hard wire cable 11 to output of sensor 10. Such filter is responsive to the output of sensor 10. The highest frequency being passed by filter 20 is about 0.033 Hz, designed so as to discriminate against noise components in the measured roll error, which generally are found at frequencies greater than 0.033 Hz.

Sense or sign polarity detector 42 is responsive to filter 20 output. Positive or negative voltage outputs from low pass filter 20 are also fed to a converter at 61 that converts the positive or negative voltages to absolute values so that these absolute values are detected by detector 62.

The output of detectors 42 and 62, are fed to normally open switch contactor pairs 32 and 34 respectively, of sampler control mechanism 30, which sampler control mechanism provides sampling clock control as at 31 at a sampling rate of about 1/20th of the nutation cycle period of the spacecraft, causing closure of contact pairs 32 and 34 every 15 seconds for a predetermined period of time. Clock binary sample timing control device 30 provides the requisite timing rate automatically to satisfy the requirements of this system and provides pulses at the requisite rates as voltage inputs to limiters 44 and 64.

Sample timing clock 31 that periodically operates switches 32 and 34 simultaneously provides the requisite sampling rates for turning these switches on and off during the sampling period. Periodic timers such as 30 are well known in the art and need not be discussed in detail. But it should be stated at this time that it is the action of periodic operation of switches 32 and 34 for a fixed predetermined period of time that gives rise to pulses as inputs to limiters 44 and 64 respectively, since the output signals of sensor 10 and filter 20, are basically of non-pulse characters.

Limiters 44 and 64 are capable of automatically adjusting the voltage level outputs therefrom to either 0 or 5 volts even if voltage inputs to these limiters exceed the 5 volt levels. Voltage levels 0 and 5 volts correspond respectively to binary values ZERO and ONE, and these binary values will be referred to from here on and in Truth Table B, hereinbelow used to identify the binary outputs from these detectors, and shown in the section of this specification entitled "Theoretical Development and Equations of Motion." Inputs provided detector 42 as one ordinate, and outputs therefrom as another ordinate is displayed in FIG. 3 in binary logic form as a ZERO or ONE. Input level in terms of both positive and negative voltages are provided to converter 61 and hence output levels from detector 62 in terms of binary logic values of ZERO and ONE are shown in FIG. 4. It is noted that the period within zones II and III when a binary ZERO level will obtain from detector 62 output is referred to as the deadband, and this deadband will be widened in response to roll correction signals as hereinabove described.

Detector 42 will provide an output at binary logic level ONE in zones III and IV as shown in FIG. 3 when a signal is provided thereto from filter 20. When filter 20 output signal is negative, the logic level will be at binary ZERO in zones I and II. Output signals from detector 42 will be present during sampling periods when control device 30 causes closure of switches 32 and 34, and provides pulse inputs to limiters 44 and 64 which are absent at other times when control sampler 30 is inoperative, that is when switch contact pairs 32 and 34 are open.

Detector 62 will provide an output at binary logic level ONE in zones I and IV as viewed in FIG. 4, when signals are provided thereto by converter 61. When the roll error is negative, binary ONE logic will be present in zone I, and when the roll error is positive binary ONE logic will be present in zone IV. When a small signal is received from filter 20, binary logic ZERO level will be exhibited within zones II and III, as seen in FIG. 4.

When positive or negative threshold values are detected by means of detector 62 in combination with inputs thereto by converter 61, the output from detector 62 will be fed to switch contact pair 34 of timing control sampler 30.

A summary of the binary bit logic in terms of outputs from detectors 42 and 62 and hence also for limiters 44 and 64 respectively, may be readily seen from examination of Truth Table B in the section hereinabove entitled "Theoretical Development and Equations of Motion."

Shift registers 46 and 66 are respectively fed by outputs provided by limiters 44 and 64. These registers provide the requisite time delay of this system and also intermediate storage of binary bits of information provided as inputs thereto. These registers are serial-input-parallel-output types, which are conventional in the art and need not be discussed in detail. These registers each have 15 storage elements so that at their outputs from their respective last storage elements 46.15 and 66.15 respectively there will be provided three-fourths of the spacecraft nutation period time delay at elements 46.15 and 66.15.

Shift operation within registers 46 and 66 between elements 46.1 . . . . 46.15 and 66.1 . . . . 66.15 respectively, is obtained at sample times of the sampling clock control 31 by providing connection of control 31 to registers 46 and 66 by means of cable 35. Such shift operation occurs immediately prior to the time when samples are taken at switches 32 and 34 thereby providing capability of shifting the information within each register and enabling new information fed to the inputs of the registers to be handled by such registers.

Therefore when there is a logic ONE in region IV, there will be present information in pulse form at switch 32 which indicates that it is desirable to fire the positive jet 80, and hence the information will be propagated through limiter 44 and register 46 and be provided at 47 as an input to AND gate 72 of logic network 70. But AND gate 72 requires another bit of information to be provided by the presence of a logic ONE at threshold switch contacts 34, the pulse representing said logic signal being propagated through limiter 64 and register 66 to ultimately provide the other input to AND gate 72 for activating positive jet 80. But simultaneously, a logic ONE input will be provided to AND gate 74 from the output of register 66 at 67. Remembering that the output from register 46 provides a binary logic ONE in zones III and IV due to action of detector 42, which output is ultimately fed through limiter 44 and register 46 at 47 to inverter 73 to provide an output to AND gate 74, so that when a binary ONE is present at the output of register 46, a binary ZERO will be present as the other input to AND gate 74 thereby inhibiting any signal from passing through gate 74 and preventing operation of negative jet 90. This operation thus far described inhibits threshold signals to one of the jets, such as jet 90, because if there was no inhibit action, there would be undesirable simultaneous jet action from both jets with a zero net correction resulting. It should also be noted that inverter 73 and gate 74 may be replaced by an exclusive logic OR gate 74' with same results as shown in the truth table. It is desirable to provide inhibit action by as little as one pulse feeding register 66, but at most by 10 pulses that correspond to one-half the nutation period of the spacecraft. Therefore, outputs will be provided from each of the storage elements 66.1 . . . . 66.10 of register 66. These outputs are provided as inputs to adder 68, well known in the art, that sums pulse outputs provided by elements 66.1 . . . . 66.10. These pulses are equally weighted to maintain simplicity of summing and computing functions.

When at least one of the pulses will be provided as outputs from elements 66.1 . . . . 66.10 to adder 68, the adder will provide the summed values of the outputs from elements 66.1 . . . . 66.10, best describable as a staircrase voltage level pattern, as input to threshold adjust circuit 69. The output of circuit 69 provides an adjustment voltage level as an input to detector 62. This voltage level corresponds to angular widths proportionate to the widths of regions II and III as viewed in FIG. 4. For example if the staircase pattern consists of only one step, then regions II and III will double in width, if it consists of two steps these regions will triple in width, and so on. Threshold output control circuits are well known in the electronic art and need not be detailed herein.

The effect of widening regions II and III is to inhibit further jet pulsing for small $\Delta\phi$ errors and to prevent overcorrection because of the delay, principally in register 66, but also in register 46, because both registers are required to provide outputs for activation of gates 72 and 74, and thereby designate proper activity of either jets 80 or 90. The feedback pulse provided from adder 68 output and threshold adjust 69 output inhibits further pulses from appearing at switch contacts 34 to prevent overcorrection of attitude of the spacecraft.

It is to be noted that under certain circumstances above mentioned, there will be a binary ZERO level insofar as input to switch contacts 34 is concerned in regions II and III. In such case, there will be a logic ZERO as one input to AND gate 72, and jet 80 will be inhibited from operation. There will also be provided logic ZERO and ONE as inputs to AND gate 74, thus inhibiting jet 90 from being activated. Additionally, there will be no outputs from elements 66.1 .... 66.10, and hence no signals passing through adder 68 and threshold adjust control 69, so that under this condition there will be no need for providing a threshold adjustment signal as input to detector 62. It is obvious that in this mode of operation, jets 80 or 90 will be inoperative.

When either gates 72 or 74 have two binary ONE inputs thereto, there will be provided as outputs therefrom binary ONE signals. These signals are designed to be present in this configuration for a period of approximately 50 milliseconds constituting the delay time through registers 46 or 66, so that jets 80 or 90, according to the above described logic, will be pulsed for a 50 millisecond time duration to provide angular precession or correction of the angular momentum vector $H_N$ of the spacecraft so as to null out the roll error. Angle $\alpha_J$, is the angle between axes X and X', where X' is the torquing axis effected by operation of jets 80 or 90. It should be noted that the angular momentum vector also has a yaw component and such yaw errors as appear are ultimately corrected by virtue of operation of the jets in correcting for roll, as hereinabove described.

Due to activation of jets 80 or 90, as hereinabove described, a nutation motion about the spacecraft momentum vector is created. This is objectionable if it is in the direction the spacecraft is pointed. Therefore, it is desirable to damp out such nutation motion. The first pulse appearing at switch 34 creates the nutation motion ultimately by virtue of firing jets 80 or 90.

In order to damp out the self-created nutation action, another pulse appearing at switch 34, which other pulse is one-half the nutation period removed in time from the first pulse, is propagated through register 66. This system also responds to the second pulse so that this second pulse if directed through adder 68 and threshold adjust control circuit 69 into detector 62 operates to widen regions II and III, as viewed in FIG. 4. The widening of these regions prevents further pulses from exciting detector 62 so that no further pulses are propagated through register 66. This second pulse also passes through register 66 to provide logic ONE inputs to gates 72 and 74 which together with pulses from output of register 46 provide action of jets 80 or 90 as hereinabove described. It has been found experimentally and analytically that the only requirement for damping out the nutation motion due to the first correction pulse is to provide another pulse spaced apart one-half the nutation period with respect to the first pulse. The second pulse is automatically provided by virtue of sensor 10 sensing the nutation error.

It is obvious that when detector 62 operates partially out of zones II and III, that the first pulse will be required to make a correction. Since it is known that a second pulse space one-half the nutation period from the first pulse will be required for the damping action, such pulse is provided immediately upon sensing of the roll error generated by the nutation action of the spacecraft.

Nutation occurring other than by reason of injection of the aforesaid first pulse, can also be damped by this system. This type of nutation also results in a larger $\Delta\phi$ which will cause the roll error signal passing through filter 20 to swing across between zones I and IV of FIGS. 3 and 4, due to the larger magnitude of such signal. This will result in outputs from detectors 42 and 62 at switches 32 and 34 and provide logic signals through both shift registers, gates and inverters to provide signals to operate jets 80 or 90 periodically and alternately at one-half nutation periods so as to continue damping until the external nutation error is removed. The three-fourths time delay provided by registers 46 and 66 from elements 46.15 and 66.15 respectively, is to enable proper phasing relative to the nutation cycle with respect to a zero roll angular reference.

It should be noted that each jet activation period results in a roll correction definable in terms of approximately one-half the width of regions II or III.

Figure 5:
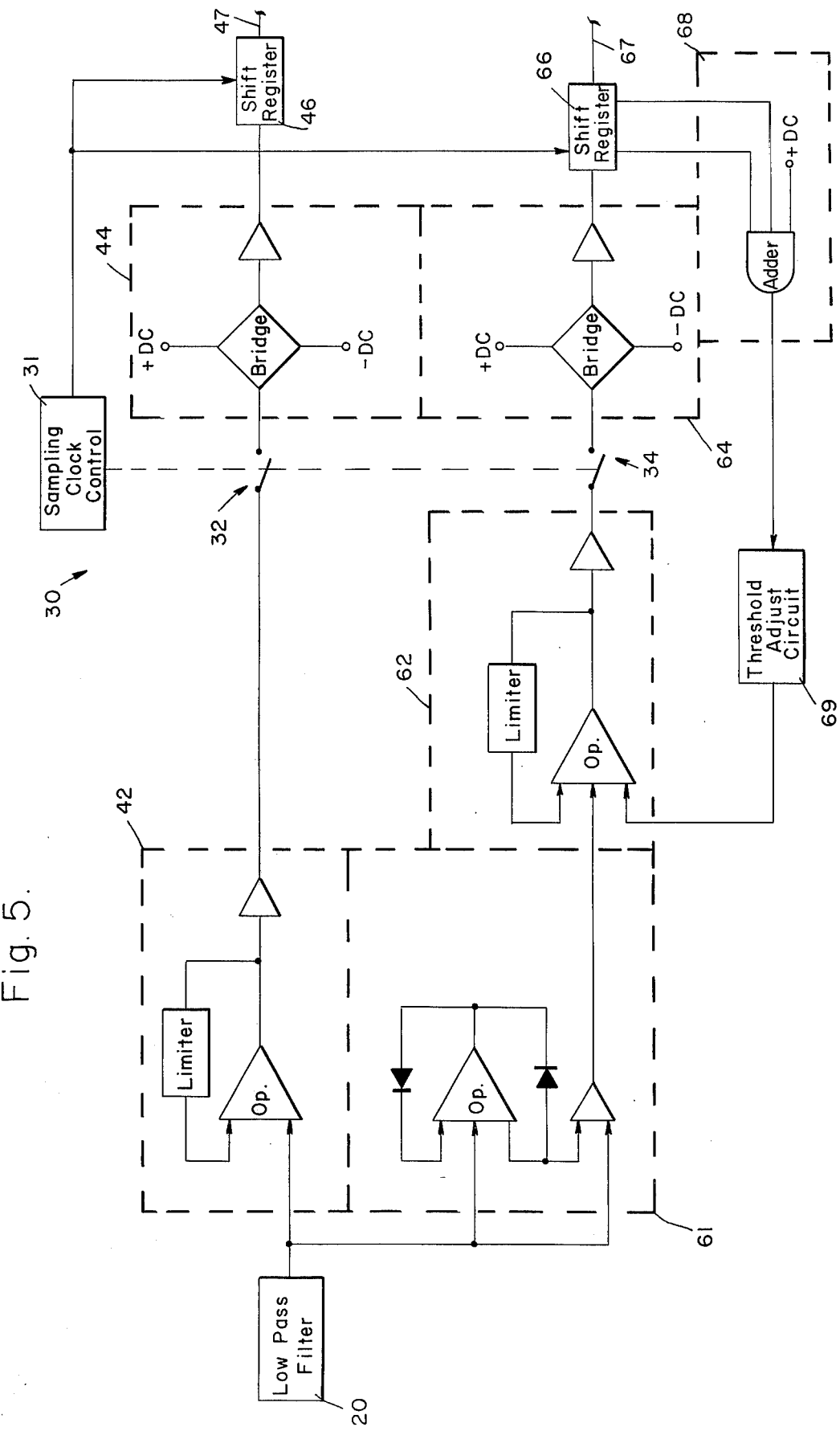
FIG. 5 is a mechanization schematic of the several components utilized in FIG. 2.

Referring to FIG. 5, a block mechanization schematic shown therein, in particular shows component portions of the circuit of FIG. 2 in greater detail. The part numbers in FIG. 5 correspond to part numbers in FIG. 2 for easy identification and comparison. Since components such as detectors 42 and 62, absolute value of voltage converter 61, and limiters 44 and 64 are shown in the textbook entitled "Analog Computer Techniques" by Johnson, second edition, pages 185–189, copyright 1963 by McGraw Hill Company, New York, it is not necessary to go beyond the block schematic level as shown in FIG. 2 herein, nor is discussion of design of such components necessary.

What is claimed is:

1. An attitude control system for providing multiple axes control to a vehicle, comprising in combination:
   a plurality of jet thrustors spaced from each other at predetermined locations at the outer periphery of the vehicle;
   an electronic control circuit including shift registers and a logic network connected to said jet thrustors for periodically imparting activation of any of the thrustors so as to correct offset of the vehicle attitude with respect to a predetermined direction; and
   a rotatable momentum wheel within said vehicle having a single degree of freedom, said wheel being independent in its rotational action of the attitude of the vehicle, said electronic control circuit being non-responsive to rotational action of said wheel.

2. The invention as stated in claim 1, wherein said electronic control circuit comprises:
  a low pass filter;
  a first control circuit responsive to signal output from said filter for sensing the polarity of the signal output; and
  a second control circuit responsive to signal output from said filter for providing threshold control of said signal output.

3. The invention as stated in claim 2, including a horizon sensor connected to the input of said low pass filter for sensing the roll error of the vehicle with respect to a preselected reference.

4. The invention as stated in claim 2, including sampler control means, electrically connected to the shift registers, for periodically passing signals through the first control circuit and through the second control circuit at a predetermined sampling rate.

5. The invention as stated in claim 4, wherein the first control circuit comprises:
  a first detector connected to the filter;
  a first limiter periodically connected by means of the sampler control means to the first detector; and
  a first of said shift registers connected to said first limiter and to the sampler control means.

6. The invention as stated in claim 5, wherein said first shift register comprises fifteen storage elements and the output of said first shift register is at the fifteenth-in-sequence of activation of the storage element of the first shift register.

7. The invention as stated in claim 4, wherein the second control circuit comprises:
  a converter connected to the filter for providing absolute values of voltage outputs therefrom;
  a second detector connected to the output of the converter;
  a second limiter periodically connected by means of the sampler control means to the second detector; and
  a second of said shift registers connected to said second limiter and to the sampler control means.

8. The invention as stated in claim 7, wherein said second shift register comprises fifteen storage elements.

9. The invention as stated in claim 8, wherein the output of said second shift register is at the fifteenth-in-sequence of activation of the storage elements of said second shift register.

10. The invention as stated in claim 8, including:
  an adder connected to the first-ten-in-sequence of operation of the storage elements of the second shift register; and
  a threshold adjust circuit connected to the output of said adder and to the input of said second detector.

11. The invention as stated in claim 2, wherein said logic network comprises a pair of binary AND gates and an inverter in series with one of the inputs of one of the AND gates, each of the outputs of said gates being connected to a corresponding one of said jet thrustors.

12. The invention as stated in claim 2, wherein said logic network comprises a binary AND gate and an exclusive OR gate, each of the outputs of said gates being connected to a corresponding one of said jet thrustors.

13. A method for providing multiple axes vehicle control employing a plurality of jet thrustors, a momentum wheel, and an electronic control circuit which includes shift registers and a logic network, comprising in combination the steps of:
  introducing time delay into commands by storing and shifting limited signal levels through said electronic control circuit to fire any of the jet thrustors for nulling nutation errors in said vehicle; and
  precessing the vehicle and adjusting wheel momentum vectors for nulling the pointing error of the vehicle.

14. The invention as stated in claim 13, including the step of controlling the frequency of firing of any of the jet thrustors as a function of the magnitude of the nutation of the vehicle.

15. The invention as stated in claim 14, wherein the steps of controlling the frequency of firing and introducing time delay, damps the nutation error to the point where the error is small enough to fall within the deadband of the electronic control circuit.

16. The invention as stated in claim 14, wherein the steps of controlling the frequency of firing and introducing time delay, damps the nutation error to the point where it is small enough to fall within the capture capability of a torquer device for reorienting said vehicle.

17. The invention as stated in claim 14, including the step of filtering signal inputs to said electronic circuit.

18. The invention as stated in claim 17, including the further steps of:
  sensing the polarity of the filtered signals; and
  controlling the threshold level of said filtered signals.

19. The invention as stated in claim 18, including the further step of logically selecting the particular one of the jet thrustors to be initiated in accordance with the results obtained from the steps of sensing the polarity and controlling the threshold level.

20. The invention as stated in claim 17 including the step of sensing the horizon of a body spaced apart from said vehicle with respect to a preselected reference on said body prior to the step of filtering.

21. The invention as stated in claim 18, including the step of sampling at a predetermined rate the sensed and threshold controlled signals.

22. The invention as stated in claim 21, including the further step of limiting the levels of the sampled signals.

23. The invention as stated in claim 13, wherein the steps of controlling the frequency of firing of any of the jet thrustors and introducing time delay into commands provides for correction of the roll error angle of said vehicle.

24. The invention as stated in claim 1, wherein the plurality of jet thrustors and electronic circuit provides damping of the nutation motion of the vehicle and correction for any roll angle error of said vehicle.

25. The invention as stated in claim 23, wherein the steps of controlling the frequency of firing and introducing time delay into commands includes variation in the deadband in the electronic control circuit.

26. The invention as stated in claim 24, wherein the firing of any of the jet thrustors produces variation in the deadband width of the electronic circuit.

* * * * *